(12) United States Patent
Suzuki et al.

(10) Patent No.: US 6,534,717 B2
(45) Date of Patent: Mar. 18, 2003

(54) SELF-LUBRICATING ENAMELED WIRE

(75) Inventors: Kazunori Suzuki, Ibaraki (JP); Kiyoshi Watanabe, Ibaraki (JP); Tomonori Sakamoto, Ibaraki (JP); Sadami Itonaga, Ibaraki (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 09/910,955

(22) Filed: Jul. 24, 2001

(65) Prior Publication Data

US 2002/0043391 A1 Apr. 18, 2002

(30) Foreign Application Priority Data

Aug. 31, 2000 (JP) ......................................... 2000-262758

(51) Int. Cl.$^7$ ................................................. H01B 7/00
(52) U.S. Cl. ............................... 174/120 R; 174/120 C
(58) Field of Search ............................... 174/36, 110 R, 174/110 N, 110 E, 120 R, 120 C; 428/383, 375, 379; 427/123, 331, 367, 383.1, 385.1

(56) References Cited

U.S. PATENT DOCUMENTS 3,668,175 A * 6/1972 Sattler ......................... 524/176
4,130,546 A * 12/1978 Goto et al. .................. 525/111
4,496,715 A * 1/1985 Sattler ...................... 428/422.8
4,508,779 A * 4/1985 Miyake et al. ......... 174/110 PM

FOREIGN PATENT DOCUMENTS

| JP | 59-28530 A | * | 2/1984 | ............ C21D/9/52 |
| JP | 03-119609 | * | 5/1991 | ............ H01B/3/30 |
| JP | 03-222211 A | * | 10/1991 | ............ H01B/7/02 |

* cited by examiner

Primary Examiner—Anthony Dinkins
Assistant Examiner—William H. Mayo, III
(74) Attorney, Agent, or Firm—Foley & Lardner

(57) ABSTRACT

A enameled wire having 100 parts by weight of a polyamide-imide resin, 1 to 5 parts by weight of a lubricant, 1 to 200 parts by weight of a masking agent-stabilized isocyanate, and 1 to 30 parts by weight of a silane coupling agent are dissolved or dispersed in a solvent to prepare a coating composition. The coating composition is then coated directly or through other insulator on the circumference of a conductor, and the coating is then baked to form a lubricating layer.

10 Claims, 1 Drawing Sheet

SELF-LUBRICATING ENAMELED WIRE

FIELD OF THE INVENTION

The present invention relates to a self-lubricating enameled wire, and more particularly to a self-lubricating enameled wire provided with a lubricating layer which is excellent in surface lubricity, abrasion resistance and adhesion to varnish as a treating agent.

BACKGROUND OF THE INVENTION

In recent years, for the purposes of reducing the size of equipment, increasing coil winding speed, and reducing inferior quality ratio of coils, it is required for an enameled wire for use in coils of electric or electronic equipment such as motors and transformers to have excellent surface lubricity and abrasion resistance which enable winding under severe conditions.

In particular, according to recent requirements to improve efficiency of motors from the viewpoint of energy saving, it is required for an enameled wire for use in high-space factor motors to have further improved surface lubricity and abrasion resistance.

The following methods (1) to (3) may be mentioned as conventional methods for improving the lubricity and abrasion resistance of enameled wires.

(1) A method wherein a lubricating material composed mainly of paraffin or a fatty acid ester is coated on the surface of enameled wires optionally followed by baking.

(2) A method wherein either a nylon resin having excellent lubricity or a coating composition prepared by adding a lubricant, such as low-molecular weight polyethylene, to a nylon resin is coated on the circumference of a conductor through other insulating layer, followed by baking of the coating.

(3) A method wherein a coating composition prepared by adding a lubricant component, such as polyethylene wax or a fatty acid ester, to an insulating coating composition containing, for example, a polyester or a polyamide-imide is coated on the circumference of a conductor through other insulating layer, followed by baking of the coating.

On the other hand, coils for use, for example, in motors and transformers, are treated with varnish, such as epoxy and unsaturated polyester, from the viewpoint of improving band strength and insulating properties of the coils.

The enameled wires, which have been subjected to lubrication treatment by the methods (1) to (3), however, are disadvantageously inferior to adhesion to the varnish as the treating agent in comparison with conventional enameled wires not subjected to lubricating treatment.

For this reason, in order to improve the reliability of coils, the development of self-lubricating enameled wires having excellent adhesion to varnish as the treating agent has been desired in the art.

SUMMARY OF THE INVENTION

Accordingly, it is an object of the invention to provide a self-lubricating enameled wire which possesses excellent lubricity, abrasion resistance, and adhesion to varnish as the treating agent.

According to the first feature of the invention, a self-lubricating enameled wire comprising a conductor and a lubricating layer formed on the circumference of said conductor directly or through other insulating layer by coating and baking a coating composition, said coating composition comprising 100 parts by weight of a polyamide-imide resin, 1 to 5 parts by weight of a lubricant, 1 to 200 parts by weight of a masking agent-stabilized isocyanate, and 1 to 30 parts by weight of a silane coupling agent, and dissolved or dispersed them in a solvent.

According to this constitution, the lubricating layer is formed by coating and baking a coating composition which is dissolved or dispersed, in a solvent, a polyamide-imide resin having excellent mechanical strength, a lubricant and a stabilized isocyanate for imparting lubricity and abrasion resistance, and a silane coupling agent for imparting the adhesion to varnish as the treating agent. Therefore, mixing of these various components in respective predetermined amounts can realize self-lubricating enameled wires possessing excellent lubricity, abrasion resistance, and adhesion to varnish as the treating agent.

BRIEF DESCRIPTION OF THE DRAWING

The invention will be explained in more detail in conjunction with the appended drawing, wherein.

DESCRIPTION OF THE PREFERRED EMBODIMENTS

Figure 1:
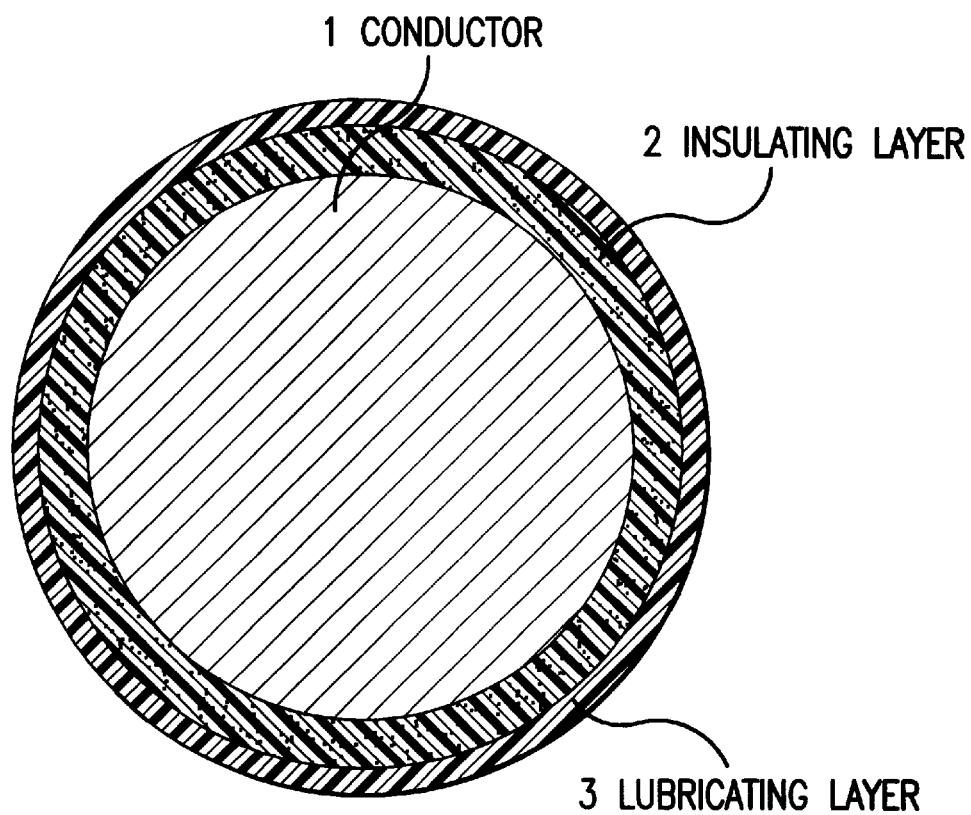
FIG. 1 is a cross-sectional view showing one preferred embodiment of the self-lubricating enameled wire according to the invention.

Preferred embodiments of the invention will be explained in conjunction with the accompanying drawing.

FIG. 1 shows a self-lubricating enameled wire according to the invention.

An insulating layer 2 is provided on the circumference of a conductor (metallic conductor) 1. A lubricating layer 3 according to the invention is provided on the circumference of the insulating layer 2.

The lubricating layer 3 is formed by using a coating composition which is dissolved or dispersed in a solvent, 100 parts by weight of a polyamide-imide resin, 1 to 5 parts by weight of a lubricant, 1 to 200 parts by weight of a stabilized isocyanate, and 1 to 30 parts by weight of a silane coupling agent. This coating composition is coated on the insulating layer 2, and then baked to form the lubricating layer 3.

The lubricant may be at least one member selected from the group consisting of polyolefin waxes and fatty acid esters. The polyolefin waxes are low-molecular weight polyolefins having a molecular weight of not more than 10000, and typical examples thereof include high density polyethylene, low density polyethylene, and polypropylene. Additional examples of polyolefin waxes include: products obtained by oxidizing the above polyolefins to introduce carboxyl groups into the molecule; and polyethylene waxes and polypropylene waxes produced by copolymerizing acid anhydrides, such as maleic anhydride and phthalic anhydride, and vinyl monomers, such as vinyl acetate, acrylic esters, and methacrylic esters.

The fatty acid esters are esters of long-chain fatty acids with alcohols, and typical examples thereof include carnauba wax, beeswax, and montan wax. However, the fatty acid ester is not limited to these waxes. The lubricant is added in an amount of 1 to 5 parts by weight based on 100 parts by weight of the polyamide-imide resin. When the amount of the lubricant is less than 1 part by weight, the lubricity and the abrasion resistance are lowered. On the other hand, when the amount of the lubricant is more than 5 parts by weight, the adhesion to varnish is lowered.

The stabilized isocyanate used in the invention has been stabilized by a masking agent, and typical examples thereof include, but are not limited to, a high-molecular weight polyisocyanate produced by reacting trimethylolpropane with diphenylmethane diisocyanate and stabilizing one end group of diphenylmethane diisocyanate with a masking agent, such as phenol or ε-caprolactam, and a low-molecular weight isocyanate produced by stabilizing an end group of diphenylmethane diisocyanate with a masking agent, such as phenol or ε-caprolactam. The stabilized isocyanate is added in an amount of 1 to 200 parts by weight based on 100 parts by weight of the polyamide-imide resin. When the amount of the stabilized isocyanate is less than 1 part by weight, the effect of enhancing the abrasion resistance is small, while when the amount of the stabilized isocyanate exceeds 200 parts by weight, the abrasion resistance is lowered.

The silane coupling agent is not particularly limited so far as the silane coupling agent is soluble in a polyamide-imide coating composition and causes no problem of the stability of the solution. Specific examples thereof include γ-glycidoxypropyltrimethoxysilane, γ-glycidoxypropylmethyldimethoxysilane, γ-glycidoxypropylmethyldiethoxysilane, β-(3,4-epoxycyclohexyl)ethyltrimethoxysilane, γ-mercaptopropyltrimethoxysilane, γ-anilinopropyltrimethoxysilane, and γ-ureidopropyltriethoxysilane. The silane coupling agent is added in an amount of 1 to 30 parts by weight based on 100 parts by weight of the polyamide-imide resin. When the amount of the silane coupling agent is less than 1 part by weight, the effect of enhancing the adhesion to varnish is small. On the other hand, when the amount of the silane coupling agent exceeds 30 parts by weight, the abrasion resistance is lowered.

Thus, the self-lubricating enameled wire of the invention is characterized in that the addition of the lubricant and the stabilized isocyanate to the polyamide-imide resin having high mechanical strength can improve the lubricity and the abrasion resistance and the addition of the silane coupling agent can improve the adhesion to varnish as the treating agent.

In the construction shown in FIG. 1, the insulating layer 2 is provided on the circumference of the conductor 1, and the lubricating layer 3 is provided on the insulating layer 2. Alternatively, a construction may be adopted wherein the lubricating layer 3 may be provided directly on the circumference of the conductor 1 without the provision of the insulating layer 2. By virtue of this construction, in the case of an identical diameter of the conductor 1, the outer diameter can be reduced while maintaining the adhesion to varnish as the treating agent, the lubricity, and the abrasion resistance.

EXAMPLES

Examples of the invention and comparative examples will be explained.

Test wires used in the following examples and comparative examples were prepared as follows. A polyester imide coating composition (EH-402-40, manufactured by Dainichiseika Co., Ltd.) was coated on the circumference of a copper conductor having a diameter of 0.8 mm to form a 25 μm-thick coating, and the coating was then baked. A polyamide-imide coating composition (HI-406-30, manufactured by Hitachi Chemical Co., Ltd.) was then coated on this coating to form a 5 μm-thick coating, and the coating was then baked. Thus, a base wire provided with a 30 μm-thick (total thickness) insulating layer was prepared. Coating compositions specified in the respective examples and comparative examples were coated on the base wire to form 3 μm-thick coatings, and the coatings were then baked.

These test wires were measured for unidirecitonal abrasion and reciprocative abrasion according to JIS C 3003 and JIS C 3003 (old edition), and for coefficient of static friction between wires by the gradient method. The adhesion to varnish as the treating agent was measured according to the NEMA method. Specifically, the test wire was brought to a helical coil having a diameter of 5.7 mm and a length of 70 mm. The helical coil was immersed in a solution prepared by diluting varnish as a treating agent (PD-923, manufactured by P. D. GEORGE) with a solvent to a nonvolatile concentration of 30%, and the coating was then cured at 150° C. This treatment was repeated twice. The curing time was one hr for the first treatment, and was 3.5 hr for the second treatment. Next, this helical coil was measured for buckling strength at a distance between the supports of 45 mm to evaluate the adhesion to varnish as the treating agent. When the reciprocative abrasion was not less than 350 times, the unidirectional abrasion was not less than 13 kN, the coefficient of static friction was not more than 0.06, and the adhesion to varnish was not less than 14 kN, the test wire was evaluated as "passed (acceptable)."

Example 1

(i) a coating composition was prepared by mixing a polyamide-imide coating composition (HI-406-30, manufactured by Hitachi Chemical Co., Ltd.)

(ii) 3 parts by weight of carnauba wax (based on 100 parts by weight of polyamide-imide resin contained in the polyamide-imide coating composition; the same shall apply hereinafter), (iii) 10 parts by weight of γ-glycidoxypropyltrimethoxysilane (SH 6040, manufactured by Toray Dow Corning Silicon Co., Ltd.), and (iv) 50 parts by weight of stabilized isocyanate (Coronate 2503, manufactured by Nippon Polyurethane Industry Co., Ltd.).

The coating composition was then coated on the base wire described above, followed by baking. Thus, a test wire of Example 1 was prepared.

Example 2

The procedure of Example 1 was repeated, except that low-density polyethylene wax (Hi-wax 110P, manufactured by Mitsui Chemicals Inc.) was used instead of carnauba wax in Example 1. Thus, a test wire of Example 2 was prepared.

Example 3

The procedure of Example 1 was repeated, except that γ-mercaptopropyltrimethoxysilane was used instead of γ-glycidoxypropyltrimethoxysilane in Example 1. Thus, a test wire of Example 3 was prepared.

Example 4

The procedure of Example 1 was repeated, except that Millionate MS-50, manufactured by Nippon Polyurethane Industry Co., Ltd. was used instead of stabilized isocyanate (Coronate 2503) in Example 1. Thus, a test wire of Example 4 was prepared.

Example 5

The procedure of Example 1 was repeated, except that the amount of carnauba wax used in Example 1 was changed to 1 part by weight. Thus, a test wire of Example 5 was prepared.

Example 6

The procedure of Example 1 was repeated, except that the amount of carnauba wax used in Example 1 was changed to 5 parts by weight. Thus, a test wire of Example 6 was prepared.

Example 7

The procedure of Example 1 was repeated, except that the amount of γ-glycidoxypropyltrimethoxysilane used in Example 1 was changed to 1 part by weight. Thus, a test wire of Example 7 was prepared.

Example 8

The procedure of Example 1 was repeated, except that the amount of γ-glycidoxypropyltrimethoxysilane used in Example 1 was changed to 30 parts by weight. Thus, a test wire of Example 8 was prepared.

Example 9

The procedure of Example 1 was repeated, except that the amount of stabilized isocyanate (Coronate 2503) used in Example 1 was changed to 1 part by weight. Thus, a test wire of Example 9 was prepared.

Example 10

The procedure of Example 1 was repeated, except that the amount of stabilized isocyanate (Coronate 2503) used in Example 1 was changed to 200 parts by weight. Thus, a test wire of Example 10 was prepared.

Comparative Example 1

The procedure of Example 1 was repeated, except that the amount of carnauba wax used in Example 1 was changed to 0.5 part by weight. Thus, a test wire of Comparative Example 1 was prepared.

Comparative Example 2

The procedure of Example 1 was repeated, except that the amount of carnauba wax used in Example 1 was changed to 7 parts by weight. Thus, a test wire of Comparative Example 2 was prepared.

Comparative Example 3

The procedure of Example 1 was repeated, except that the amount of γ-glycidoxypropyltrimethoxysilane used in Example 1 was changed to 0.5 part by weight. Thus, a test wire of Comparative Example 3 was prepared.

Comparative Example 4

The procedure of Example 1 was repeated, except that the amount of γ-glycidoxypropyltrimethoxysilane used in Example 1 was changed to 40 parts by weight. Thus, a test wire of Comparative Example 4 was prepared.

Comparative Example 5

The procedure of Example 1 was repeated, except that the amount of stabilized isocyanate (Coronate 2503) used in Example 1 was changed to 0.5 part by weight. Thus, a test wire of Comparative Example 5 was prepared.

Comparative Example 6

The procedure of Example 1 was repeated, except that the amount of stabilized isocyanate (Coronate 2503) used in Example 1 was changed to 250 parts by weight. Thus, a test wire of Comparative Example 6 was prepared.

TABLE 1-1

Formulations of coating compositions and properties of enameled wires of examples
(Amount: parts by weight)

| Item | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Component of coating composition | Polyamide-imide resin | | 100 | 100 | 100 | 100 | 100 | 100 | 100 | 100 | 100 | 100 |
| | Lubricant | Carnauba wax | 3 | — | 3 | 3 | 1 | 5 | 3 | 3 | 3 | 3 |
| | | Low-density polyethylene | — | 3 | — | — | — | — | — | — | — | — |
| | Silane coupling agent | γ-Glycidoxypropyl-trimethoxysilane | 10 | 10 | — | 10 | 10 | 10 | 1 | 30 | 10 | 10 |
| | | γ-Mercaptopropyl-trimethoxysilane | — | — | 10 | — | — | — | — | — | — | — |
| | Stabilized isocyanate | Coronate 2503 | 50 | 50 | 50 | — | 50 | 50 | 50 | 50 | 1 | 200 |
| | | Millionate MS-50 | — | — | — | 50 | — | — | — | — | — | — |
| Properties of enameled wire | Reciprocative abrasion, times | | 455 | 420 | 460 | 422 | 373 | 560 | 483 | 440 | 355 | 468 |
| | Unidirectional abrasion, kN | | 13.8 | 13.7 | 13.6 | 13.5 | 13.5 | 14.5 | 14.0 | 13.5 | 13.2 | 13.9 |
| | Coefficient of static friction | | 0.043 | 0.047 | 0.042 | 0.045 | 0.054 | 0.041 | 0.042 | 0.044 | 0.045 | 0.041 |
| | Adhesion to varnish, kN | | 155 | 150 | 148 | 155 | 162 | 140 | 141 | 156 | 160 | 145 |
| | Evaluation (○: passed, X: failed) | | ○ | ○ | ○ | ○ | ○ | ○ | ○ | ○ | ○ | ○ |

TABLE 1-2

Formulations of coating compositions and properties of enameled wires of comparative examples
(Amount: parts by weight)

| Item | | | Comparative example 1 | 2 | 3 | 4 | 5 | 6 |
|---|---|---|---|---|---|---|---|---|
| Component of coating composition | Polyamide-imide resin | | 100 | 100 | 100 | 100 | 100 | 100 |
| | Lubricant | Carnauba wax | 0.5 | 7 | 3 | 3 | 3 | 3 |
| | | Low-density polyethylene | — | — | — | — | — | — |
| | Silane coupling agent | γ-Glycidoxypropyltrimethoxysilane | 10 | 10 | 0.5 | 40 | 10 | 10 |
| | | γ-Mercaptopropyltrimethoxysilane | — | — | — | — | — | — |
| | Stabilized isocyanate | Coronate 2503 | 50 | 50 | 50 | 50 | 0.5 | 250 |
| | | Millionate MS-50 | — | — | — | — | — | — |
| Properties of enameled wire | Reciprocative abrasion, times | | 268 | 680 | 458 | 341 | 331 | 339 |
| | Unidirectional abrasion, kN | | 12.5 | 14.8 | 13.9 | 12.9 | 12.9 | 12.8 |
| | Coefficient of static friction | | 0.068 | 0.040 | 0.042 | 0.045 | 0.045 | 0.048 |
| | Adhesion to varnish, kN | | 165 | 115 | 133 | 160 | 157 | 145 |
| | Evaluation (○: passed, X: failed) | | X | X | X | X | X | X |

Table 1 shows the component of coating compositions and properties of enameled wires of Examples 1 to 10 and Comparative Examples 1 to 6.

The effectiveness of the invention will be explained with reference to Table 1.

As is apparent from Table 1, all the test wires of Examples 1 to 10 had good property values and were evaluated as "passed" in all the abrasion resistance, the lubricity, and the adhesion to varnish as the treating agent.

By contrast, for the test wire of Comparative Example 1 wherein the content of the lubricant in the coating composition is less than the lubricant content of the coating compositions used in the examples of the invention, the property values of reciprocative abrasion resistance, unidirectional abrasion resistance, and coefficient of static friction were inferior and were evaluated as "failed." For the test wire of Comparative Example 2, wherein the content of the lubricant in the coating composition is more than the lubricant content of the coating compositions used in the examples of the invention, and for the test wire of Comparative Example 3 wherein the content of the silane coupling agent in the coating composition is less than the silane coupling agent content of the coating compositions used in the examples of the invention, the adhesion to varnish was inferior and were evaluated as "failed." For the test wire of Comparative Example 4 wherein the content of the silane coupling agent in the coating composition is more than the silane coupling agent content of the coating compositions used in the examples of the invention, the reciprocative abrasion resistance and the unidirectional abrasion resistance were inferior and were evaluated as "failed." Further, for the test wire of Comparative Example 5, wherein the content of the stabilized isocyanate in the coating composition is less than the stabilized isocyanate content of the coating compositions used in the examples of the invention, and for the test wire of Comparative Example 6 wherein the content of the stabilized isocyanate in the coating composition is more than the stabilized isocyanate content of the coating compositions used in the examples of the invention, the reciprocative abrasion resistance and the unidirectional abrasion resistance were inferior and were evaluated as "failed."

As is apparent from the foregoing description, the enameled wires of the invention were superior in all the abrasion resistance (reciprocative abrasion resistance and unidirecitonal abrasion resistance), the lubricity (coefficient of static friction), and the adhesion to varnish as a treating agent.

Thus, according to the invention, by virtue of the adoption of a construction such that a lubricating layer is provided on the surface of the conductor by coating a coating composition in the form of a solution or dispersion, in a solvent, of a polyamide-imide resin, a lubricant, a stabilized isocyanate, and a silane coupling agent onto the circumference of the conductor and baking the coating, the self-lubricating enameled wire of the invention possesses excellent lubricity, abrasion resistance, and adhesion to varnish as a treating agent.

The invention has been described in detail with particular reference to preferred embodiments, but it will be understood that variations and modifications can be effected within the scope of the invention as set forth in the appended claims.

What is claimed is:

1. A self-lubricating enameled wire comprising a conductor and a lubricating layer formed on the circumference of said conductor directly or through other insulating layer by coating and baking a coating composition, said coating composition comprising 100 parts by weight of a polyamide-imide resin, 1 to 5 parts by weight of a lubricant, 1 to 200 parts by weight of a masking agent-stabilized isocyanate, and 1 to 30 parts by weight of a silane coupling agent, and dissolved or dispersed them in a solvent.

2. The self-lubricating enameled wire according to claim 1, wherein the lubricant is at least one member selected from the group consisting of polyolefin waxes and fatty acid esters.

3. A self-lubricating enameled wire comprising:
   a conductor; and
   a lubricating layer surrounding the conductor, the lubricating layer including about 100 parts by weight of a polyamide - imide resin;
   about 1 to 5 parts by weight of a lubricant;
   about 1 to 200 parts by weight of a masking agent-stabilized isocyanate; and
   about 1 to 30 parts by weight of a silane coupling agent.

4. The self-lubricating enameled wire according to claim 3, further comprising an insulating layer interposed between the conductor and the lubricating layer, wherein the lubricating layer is formed on the insulating layer.

5. The self-lubricating enameled wire according to claim 4, wherein the lubricant includes at least one member selected from the group consisting of polyolefin waxes and fatty acid esters.

6. The self-lubricating enameled wire according to claim 3, wherein the lubricant includes at least one member selected from the group consisting of polyolefin waxes and fatty acid esters.

7. A method for making a self-lubricating enameled wire, said method comprising:

adding about 100 parts by weight of a polyamide-imide resin, about 1 to 5 parts by weight of a lubricant, about 1 to 200 parts by weight of a masking agent-stablized isocyanate, and about 1 to 30 parts by weight of a silane coupling agent to a solvent to prepare a coating composition;

coating a conductor with the coating composition; and heating the coating composition to form a lubricating layer on the conductor.

8. A method for making a self-lubricating enameled wire according to claim 7, wherein the lubricant includes at least one member selected from the group consisting of polyolefin waxes and fatty acid esters.

9. A method for making a self-lubricating enameled wire, said method comprising:

adding about 100 parts by weight of a polyamide-imide resin, about 1 to 5 parts by weight of a lubricant, about 1 to 200 parts by weight of a masking agent-stablized isocyanate, and about 1 to 30 parts by weight of a silane coupling agent in a solvent to prepare a coating composition;

coating an insulated conductor with the coating composition; and heating the coating composition to form a lubricating layer on the insulated conductor.

10. A method for making a self-lubricating enameled wire according to claim 9, wherein the lubricant includes at least one member selected from the group consisting of polyolefin waxes and fatty acid esters.

* * * * *